Oct. 23, 1962
G. S. LOZIER
3,060,255
PRIMARY CELLS
Filed Dec. 12, 1958
3 Sheets-Sheet 1
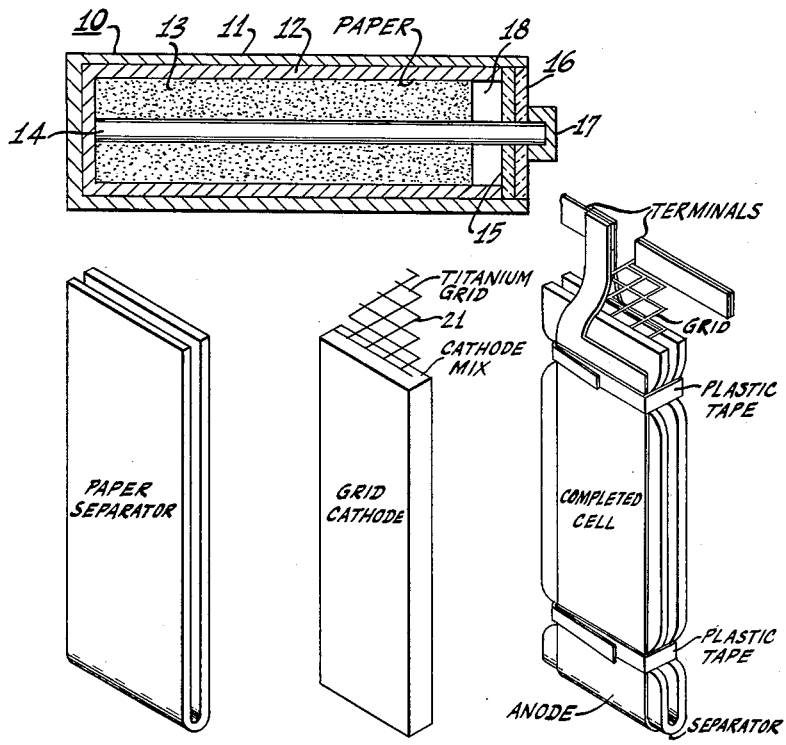
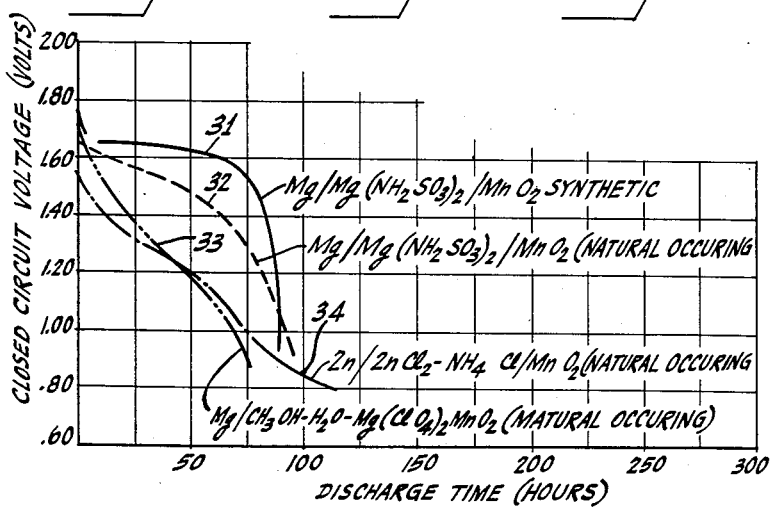
INVENTOR.
GERALD S. LOZIER
BY
W.S. Hill
AGENT Oct. 23, 1962

G. S. LOZIER 3,060,255

PRIMARY CELLS

Filed Dec. 12, 1958

INVENTOR.
GERALD S. LOZIER
BY
W.S. Hill
AGENT

United States Patent Office 3,060,255
Patented Oct. 23, 1962

3,060,255
PRIMARY CELLS
Gerald S. Lozier, Trenton, N.J., assignor to Radio Corporation of America, a corporation of Delaware
Filed Dec. 12, 1958, Ser. No. 779,902
20 Claims. (Cl. 136—100)

This invention relates to primary cells, and more particularly to improved primary cells including a magnesium anode.

Primary cells are devices which convert stored chemical energy directly to electrical energy by an electrochemical process. Generally, the term primary cell refers to the class of cells in which the chemical reactions are not efficiently reversible. Cells having efficiently reversible chemical reactions are known as storage cells, or secondary cells, and may be recharged and used again, while primary cells are usually discarded once the chemical energy is converted to electrical energy. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply in any one of a variety of applications should have the following characteristics: long shelf life; low cost; a high flat operating voltage over a wide range of current drains; a high rate at which electrical energy can be withdrawn per unit of cell volume and weight; and a large capacity of electrical energy that can be withdrawn per unit of cell volume and weight.

Cells with magnesium anodes yield considerable electrical energy per unit of cell volume and weight. The term "magnesium anode" as used hereafter in the specification and claims will be understood to include both substantially pure magnesium and magnesium-base alloys containing more than 50% magnesium. It has been known to use in magnesium anode cells an electrolyte consisting of an aqueous solution of magnesium bromide. Other bromides such as those of the alkali metals, the alkaline earth metals, and ammonium have also been utilized in aqueous solution as the electrolyte with magnesium anode cells. Bromide electrolytes have the disadvantage of forming complex compounds with cupric oxide and silver oxide, thereby reducing the cell potential and shelf life. Since aqueous halide solutions are also somewhat corrosive, other electrolytes have been utilized in which the solute is a compound such as magnesium perchlorate, and the solvent is an organic liquid such as pyridine, nitromethane, or an alcohol. Such electrolytes are relatively expensive as compared to the aqueous bromide solutions, due to the cost of the organic solvent.

An object of this invention is to provide improved primary cells including a magnesium anode.

A further object of this invention is to provide an improved electrochemical system which may be employed in primary cells.

Another object is to provide an improved electrolyte for primary cells having magnesium anodes.

Still another object is to provide improved primary cells including materials which are comparatively inexpensive.

Yet another object is to provide improved primary cells having a relatively high flat operating voltage level over a wide range of current drains.

But another object is to provide improved primary cells having a high watt-hour and a high ampere-hour capacity per unit of cell volume and cell weight.

These and other objects and advantages are obtained by the present invention which provides improved primary cells including a magnesium anode with an electrolyte composed of a water-soluble sulfamate in an entirely aqueous solution. Suitable sulfamates include those of ammonium, the alkali metals, the alkaline earth metals, aluminum, manganese and zinc. The sulfamates of ammonium, lithium, sodium, potassium, magnesium, calcium, strontium and barium are suitable for primary cells of the dry type, while sulfamates of aluminum, manganese and zinc are suitable for primary cells of the reserve type previously mentioned. It has unexpectedly been found that superior static and operating characteristics are obtained in magnesium anode cells employing aqueous sulfamate electrolytes.

The invention will be described in greater detail in connection with the accompanying drawings, in which:

FIGURE 1 is a cross-sectional elevational view of a typical dry cell according to the invention;

FIGURE 2 is an exploded perspective view of a typical reserve cell according to the invention;

FIGURE 3 is a set of curves showing the change in cell voltage with respect to discharge time of Examples 1 and 2 of "AA" size dry cells of the invention when discharged continuously through a 150 ohm resistance, together with curves for comparable dry cells according to the prior art;

Figure 7:
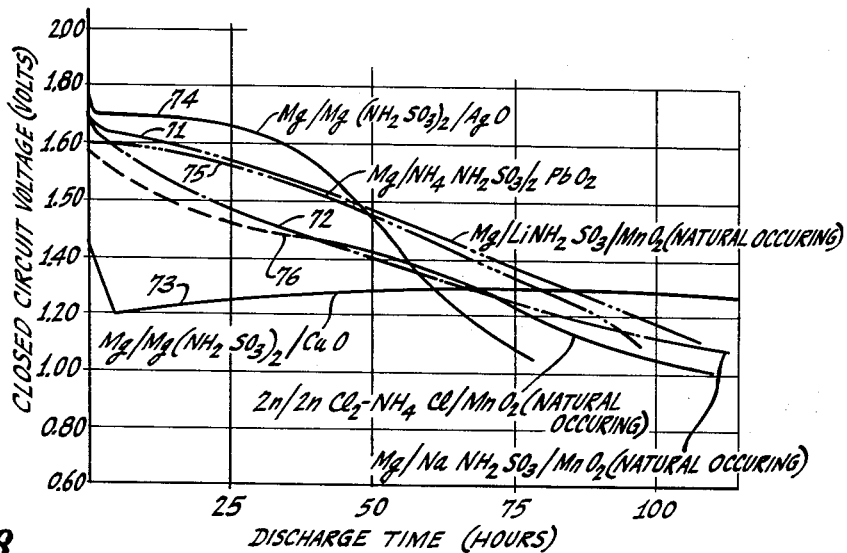
Figure 8:
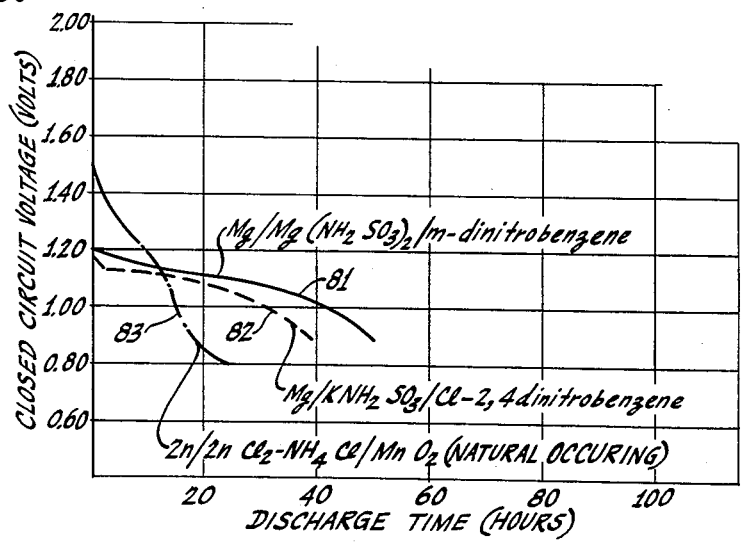

FIGURE 7 is a set of curves showing the change in cell voltage with respect to discharge time of Examples 3 to 7 of "AA" size dry cells of the invention when discharged continuously through a 150 ohm resistance, together with a curve for a comparable prior art cell; and, FIGURE 8 is a set of curves showing the variation of cell voltage with discharge time for Examples 9 and 10 of "AA" size dry cells of the invention when discharged continuously through a 50 ohm resistance, together with a curve for a comparable prior art cell.

To facilitate the explanation of the invention in detail, the construction and operating characteristics of several typical dry cells according to this invention are first described. These cells are then compared with the dry cells of the prior art, with particular emphasis upon cell capacity and anode corrosion. Thereafter various electrolyte compositions, anode compositions, cathode compositions, and inhibiting materials are described. Finally a number of typical cells demonstrating particular representative combinations of aqueous sulfamate electrolytes and cathode materials, as well as the operating characteristics of each, are set forth and compared with several commercially available cells.

EXAMPLE 1

Referring to FIGURE 1, a dry cell 10 of conventional design may be prepared as follows: a metallic anode 11 is prepared in the form of a cup of a standard "AA" size. (American Standards Association, Bureau of Standards, Washington, D.C.) The anode 11 has the approximate composition 98.4% magnesium, 1.0% aluminum, 0.5% zinc and 0.1% calcium. This alloy composition is sometimes designated AZ10A. The anode 11 is lined with a separator 12 comprising an absorbent kraft paper. Within the compartment, of which the separator 12 now forms the outer wall, is the cathode mixture 13 of materials comprising a cathode depolarizer, an ingredient for increasing the conductivity of the composition, an electrolyte and a corrosion inhibitor. The separator 12 keeps the anode 11 and cathode 13 apart while providing therebelow a low resistance path to the flow of ions during the electrochemical process.

The mixture 13, including the cathode material and electrolyte, hereinafter referred to as the cathode mix, is prepared of the following constituents in the proportions indicated:

87 grams $MnO_2$, type M, synthetic type, as the cathode depolarizer.
10 grams Shawinigan acetylene black to increase the conductivity of the cathode mix.
3 grams barium chromate to inhibit corrosion.
55 ml. of an electrolyte consisting of an aqueous solution containing 1 mol (202.5 grams) magnesium sulfamate and 1 gram of $Li_2CrO_4 \cdot 2H_2O$ per liter of water, saturated with $Mg(OH)_2$ to adjust pH.

Approximately 8 grams of the cathode mix is formed as a cylindrical slug or bobbin and inserted in the paper lined anode 11 to form the cathode. A carbon rod 14 is inserted into the mix 13 to provide electrical connection thereto. The anode 11 is sealed by an insulating washer 15 mounted on the carbon rod, and a layer 16 of wax is deposited on the washer 15. The wax 16 may for example be a high melting paraffin, or a tar base material. A metal contact cap 17 of brass is placed on the carbon rod 14. An air space 18 is provided between the washer 15 and the cathode 13. The anode and cathode may now be connected through an external load. The cell then commences to deliver current by electrochemical action.

EXAMPLE 2

A similar dry cell utilizing natural manganese dioxide (also known as African manganese dioxide) and constructed substantially as the cell of Example 1 is shown in FIGURE 1, is prepared with a cathode mix as follows:

$MnO_2$, African _____ grams__ 174
Shawinigan acetylene black _____ do____ 20
Barium chromate _____ do____ 6
Aqueous solution containing 1 mole (202.5 grams) magnesium sulfamate and 1 gram of $Li_2CrO_4 \cdot 2H_2O$ per liter of water, saturated with $Mg(OH)_2$ to adjust pH _____ ml__ 90

The bobbin weight is 8 grams.

In FIGURE 3 are shown characteristic discharge curves for "AA" size dry cells according to the invention discharged continuously through a 150 ohm load resistance. The 150 ohm load resistance simulates the current drain requirements of a transistor-operated portable radio, for example. Curve 31 shows the characteristic discharge curve for the cells of Example 1 which employ synthetic manganese dioxide cathode material. Curve 32 shows the discharge characteristics of the similar cells of Example 2, which utilize African natural-occurring manganese dioxide. For comparison, curve 33 shows the discharge characteristic under the same conditions for the prior art cell described above which has an African manganese dioxide cathode, a magnesium anode, and an electrolyte consisting of magnesium perchlorate in a water-alcohol solvent. Curve 34 shows the characteristic discharge curve for a conventional "AA" size Leclanche cell. The dry cells of Examples 1 and 2 according to the invention exhibit high, flat voltage curves resulting in a more uniform performance of the equipment which is operated by electric power therefrom. Not only is the voltage of cells according to the invention higher, but the dry cells of Examples 1 and 2 also supply power for longer periods to an 0.9 volt cutoff than the alcohol electrolyte cell. This cutoff voltage represents the practical voltage below which most portable equipment becomes inoperative.

Figure 4:
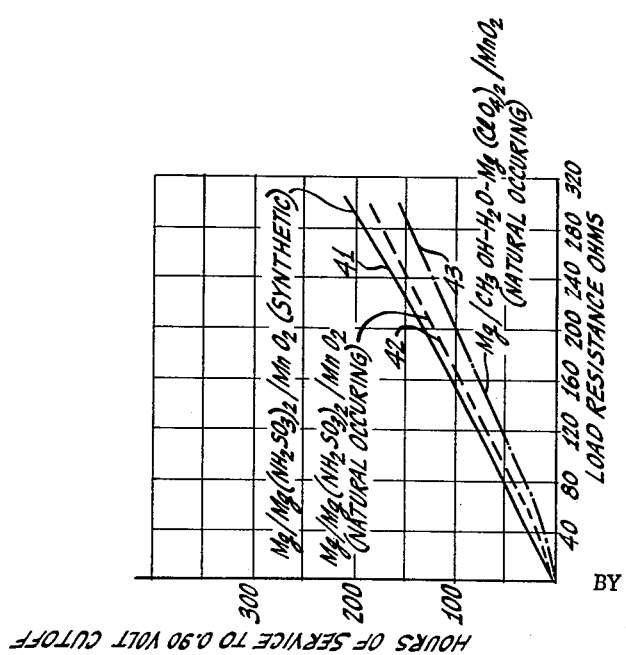
FIGURE 4 is a set of curves illustrating the hours of service delivered by the cells of Examples 1 and 2 for various load resistances together with a curve for a comparable prior art dry cell.

Referring now to FIGURE 4, the dry cells of Examples 1 and 2 are compared for hours of service to an 0.9 volt cutoff for various load resistances. Curves 41 and 42 show, respectively, the hours of service at various loads for the cells of Examples 1 and 2. The prior art cell using the alcohol electrolyte referred to previously is shown for comparison in curve 43. The dry cells of Examples 1 and 2 provide more hours of service over a wide range of current drains than the prior art cells of curve 43.

Figure 5:
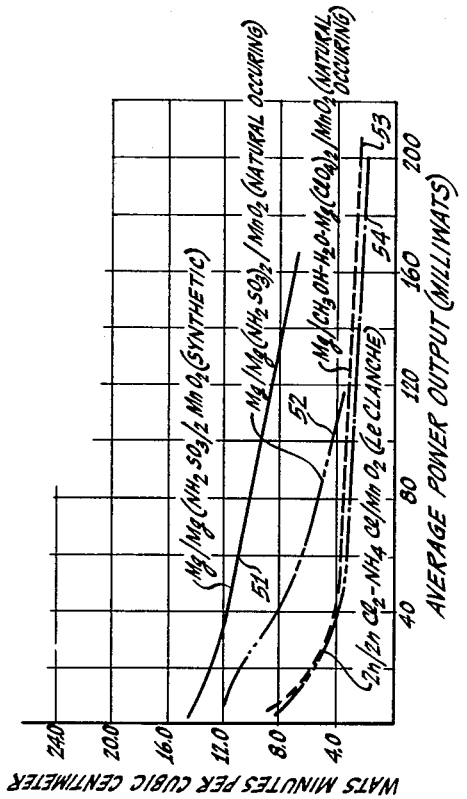
FIGURE 5 is a set of curves illustrating the watt minutes per cubic centimeter for various power outputs for the cells of Examples 1 and 2, together with curves for comparable dry cells utilizing other electrochemical systems.

Referring now to FIGURE 5, the dry cells of Examples 1 and 2 are compared as to capacity in watt-minutes per cubic centimeter to an 0.9 volt cutoff for various power outputs. Summary curve 51 shows the watt-minutes per cc. for the cells of Example 1. Curve 52 similarly shows the capacity in watt-minutes per cubic centimeter for the cells of Example 2. It will be noted in FIGURES 3 through 5 that the cells of Example 1, which contain synthetic manganese dioxide, perform somewhat better than the cells of FIGURE 2 which contain African manganese dioxide. Summary curve 53 shows the watt-minutes per cc. for the prior art alcohol electrolyte cell. Curve 54 shows the capacity of the conventional Leclanche dry cell consisting of zinc/zinc chloride-ammonium chloride/African manganese dioxide. The dry cells of Examples 1 and 2 provide more power per unit volume over a wide range of current drains than the prior art cells of curves 53 and 54.

Figure 6:
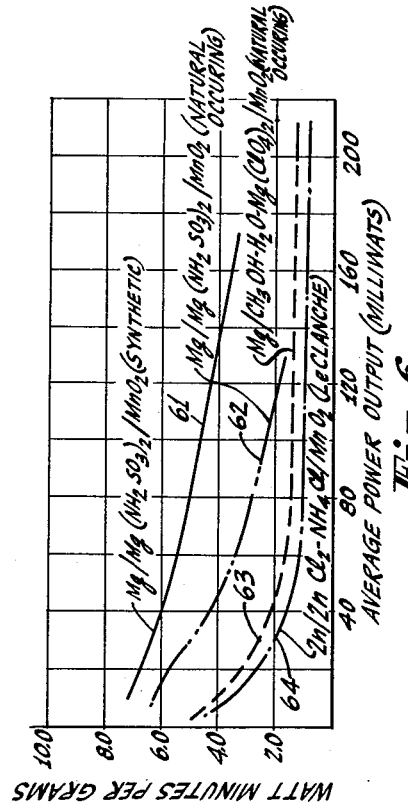
FIGURE 6 is a set of curves illustrating the capacity in watt minutes per gram at various power output levels for the cells of Examples 1 and 2, together with curves for comparable dry cells of the prior art.

In FIGURE 6 the dry cells of Examples 1 and 2 are compared as to watt-minutes per gram of cell to an 0.9 volt cutoff for various power outputs. Summary curve 61 shows the watt-minutes per gram for the cells of Example 1. Curve 62 shows the capacity in watt-minutes per gram for the cells of Example 2. Summary curve 63 shows the watt-minutes per gram for the prior art alcohol electrolyte cell. Curve 64 shows the capacity in watt-minutes per gram for the previously mentioned Leclanche cell. The dry cells of Examples 1 and 2 provide more total power per unit weight over a wide range than the prior art cells referred to.

It is thus apparent from FIGURES 3 to 6 that cells made in accordance with the instant invention, such as the dry cells of Examples 1 and 2, are superior to the prior art alcohol electrolyte and Leclanche cells in such important parameters as operating voltage, hours of service to 0.9 volt cutoff, capacity per unit of volume, and capacity per unit of weight.

Inasmuch as it has previously been thought that organic solutions of magnesium salts are preferred as electrolytes because of the corrosiveness of aqueous solutions, investigations were made to determine the extent of corrosion of magnesium anodes by aqueous electrolytes. Corrosiveness in cells employing the solutions of the present invention were found to be unexpectedly low. When the low corrosion rate of cells made according to the instant invention is considered in conjunction with the undoubtedly superior characteristic of these cells, as demonstrated in Examples 1, 2 and 3, it will be appreciated that the invention provides cells of outstandingly improved performance.

The following table indicates the nature and concentration of some of the various solutions investigated and the corrosion rate of the magnesium samples by these solutions. A magnesium cylinder of ½" diameter was placed in each solution, and the amount and rate of hydrogen evolution was measured. The temperature in all instances was 70° F. Two examples of magnesium bromide-magnesium hydroxide solutions are given, and two examples of magnesium sulfamate-magnesium hydroxide solutions, so as to show the upper and lower limits which may be expected.

TABLE I

*Corrosion Rate: Various Mg Salt Solutions*

| | Solution: g./liter of $H_2O$ | Vol. of $H_2$ Released in cc. | Total Time in Hours | Average rate of Release cc. per Hr. |
|---|---|---|---|---|
| (1) | 228 gms. $MgCl_2 \cdot 6H_2O$ | 16 | 5 | 3.2 |
| (2) | 440 gms. $MgBr_2 \cdot 6H_2O$ | 16 | 10 | 1.6 |
| (3) | 250 gms. $MgSO_3NH_2$ | 16 | 45 | 0.355 |
| (4) | 228 gms. $MgCl_2 \cdot 6H_2O$ / 10 gms. $Mg(OH)_2$ | 16 | 5 | 3.2 |
| (5) | 440 gms. $MgBr_2 \cdot 6H_2O$ / 10 gms. $Mg(OH)_2$ | 16 | 200 | 0.080 |
| (6) | 440 gms. $MgBr_2 \cdot 6H_2O$ + / 10 gms. $Mg(OH)_2$ | 16 | 275 | 0.058 |
| (7) | 250 gms. $MgSO_3NH_2$ / 10 gms. $Mg(OH)_2$ | 10.0 | 238 | 0.042 |
| (8) | 250 gms. $MgSO_3NH_2$ / 10 gms. $Mg(OH)_2$ | 10.5 | 238 | 0.044 |

It will be noted that the aqueous sulfamate solutions are unexpectedly far less corrosive than the aqueous halide solutions. Magnesium bromide has another disadvantage as an electrolyte in magnesium cells, due to the tendency of bromide ions to form complexes with the cation of such cathode materiasl as cupric oxide and silver oxide.

The primary cells of the invention comprise generally the following parts:

(1) an anode selected from the group of materials consisting of magnesium and magnesium-base alloys, (2) a cathode including a depolarizer consisting of an oxidizing substance selected from a large group of materials. These oxidizing substances may be aliphatic azo groups, nitroso groups, nitro groups, N-halogens, copper hydroxide, the oxides of bismuth, manganese, lead, silver, nickel, and copper. The cathode may also include other materials such as finely divided carbon, for example, carbon blacks such as Shawinigan acetylene black, G. Cabot experimental battery black, Atlas Powder Co. Darco G-60, and Acheson graphite No. 615, for increasing the conductivity of the cathode and for holding the electrolyte, (3) an electrolyte which includes a water soluble sulfamate or a mixture of water soluble sulfamates. These sulfamates may be selected from the group consisting of aluminum, manganese, zinc, the alkali metals and alkaline earth metals. The electrolyte may also include a material for inhibiting the corrosion of the anode.

*The Anode*

The anode for the primary cells of the invention may be magnesium or magnesium-base alloys. While any magnesium-base alloy having more than 50 percent magnesium may be used, it is preferable to have as high a proportion of magnesium as possible. Other ingredients are added to magnesium to improve the properties of the anode for fabrication purposes, to impart a greater degree of corrosion resistance, or for other reasons. Table II sets forth examples of magnesium-base alloys which are suitable for anode material, together with the corresponding ASTM Designations.

TABLE II

*Anode Compositions*

| Alloy No. | A.S.T.M. Designation | Nominal Composition [1] | | | | | |
|---|---|---|---|---|---|---|---|
| | | Al | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10.0 | 0.1 | | | | |
| 5 | A12 | 12.0 | 0.1 | | | | |
| 5a | AZ10A | 1.0 | | 0.5 | | | 0.10 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 9.0 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | Z1 | | | 1.0 | | | |

[1] Balance commercial magnesium.

The magnesium anode may be the container for the cell, may be the lining of the container, or may be a separate structure inserted in the container. The magnesium anode may be in any geometrical configuration desired. As indicated above, the term "magnesium anode" is used in the specification and claims as including both substantially pure magnesium and those magnesium-base alloys which contain more than 50% magnesium by weight.

It is necessary to space the cathode and anode from one another. To accomplish this, it is preferred to insert a separator between the anode and the cathode regardless of configuration, although other methods of spacing may be used. The separator may be any porous material such as kraft paper, kraft paper treated with a gel-like material such as carboxymethyl-cellulose, polyvinyl alcohol, or a starch-flour gel. The coating on the kraft paper promotes adhesion of the paper to the anode and maintains good contact between the electrolyte and the anode. Porous ceramics or other inorganic or organic structures may be used in place of paper.

*The Electrolyte*

The electrolyte is an aqueous solution containing a soluble sulfamate. Since a magnesium anode is employed in the primary cells of the invention, it is preferred to employ an aqueous solution of magnesium sulfamate to keep the electrochemical system comparatively simple and uncomplicated. However, other water-soluble sulfamates may be employed, such as the sulfamates of the alkali metals; the alkaline earth metals; and the group consisting of manganese, aluminum, and zinc. The electrolyte may be prepared by dissolving the sulfamate, for example magnesium sulfamate, in water in a concentration ranging from about 50 grams per liter to the concentration required to produce a saturated solution at ordinary temperatures. For example, a preferred concentration of anhydrous magnesium sulfamate is about 250 grams per liter. The concentration does not appear to be critical, although for best results certain concentrations are to be preferred depending upon the particular sulfamate used. Combinations of these sulfamates may also be used.

It is also desirable to include in the electrolyte one or more salts of chromic acid in sufficient amounts to inhibit corrosion. Suitable chromic acid salts are those of the alkali metals, the alkaline earth metals, and ammonium. The chromic acid salts may be used in proportions between .01 gram per liter of solution up to concentrations producing saturation in the presence of the dissolved sulfamate. A preferred concentration of hydrated lithium chromate is about .05 to 2.0 gram per liter of solution. Examples of corrosion-inhibiting salts are sodium chromate, ammonium chromate, potassium dichromate, lithium dichromate, magnesium chromate, calcium chromate and barium chromate. Mixtures of the chromates may also be used.

For certain applications, principally where a long shelf life is required, it is desirable to omit one of the essential components until the need for electrical energy arises. The primary cells of the invention are particularly adaptable to preparation as reserve cells, for example, by omitting the electrolyte until just prior to use. In reserve cells the more corrosive sulfamates, such as those of manganese, zinc, and aluminum, may also be used. These sulfamates provide an electrolyte which is more acidic than the other sulfamates mentioned, so that the cathode has a higher operating potential than in more basic electrolytes.

The Cathode

As will be apparent from the numerous examples following hereinafter, the cathode or oxidizing substance may be selected from a large group including inorganic as well as organic oxidizing substances in whole or in part.

Inorganic Oxidizing Substances

In general the inorganic oxidizing substances which will be used for a cathode material are the oxides of various metals. Among the more important oxides are those of copper (both cupric and cuprous), manganese, lead, silver bismuth, and nickel. Other oxidizing substances which may be used as a cathode material include oxygen, copper hydroxide, copper chloride, and silver chloride.

Organic Oxidizing Substances

The cathode may also include organic oxidizing substances in which the oxidizing properties are due at least in part to chemically combined organic groups. These organic oxidizing materials may be grouped as: (1) nitro compounds; (2) nitroso compounds; (3) aliphatic azo compounds; and (4) N-halogen compounds. During the electrochemical action, the substance undergoes a reduction as the primary cells furnish electric current.

Nitro Compounds

The organic nitro compounds which are insoluble in conventional electrolytes are particularly suitable for use as cathode materials in dry cells. These organic nitro compounds are disclosed in detail in a copending application of C. K. Morehouse and R. Glicksman, Serial No. 591,050, filed June 13, 1956, issued March 31, 1959 as U.S. Patent 2,880,122 and assigned to the instant assignee. Some of these insoluble organic nitro compounds are liquids which are immiscible in the electrolyte and can be adsorbed by materials such as acetylene black or graphite.

The following list gives examples of nitro compounds which are useful in the primary cells of the invention. While the above-referred to copending application lists many more specific organic nitro compounds, only a few will be mentioned herein.

A. Benzene Compounds Having One Nitro Group Per Ring
   Nitrobenzene
   o- and m- and p-Nitrotoluene
   o- and m- and p-Nitrobenzamide
B. Benzene Compounds Having Two Nitro Groups Per Ring
   m- and p-Dinitrobenzene
   3,5 dinitrobenzamide
   2,4 dinitrotoluene
   2,4 dinitroanisole
C. Benzene Compounds Having Three Nitro Groups Per Ring
   2,4,6 trinitroaniline
   5-tert-butyl-2,4,6-trinitro-m-xylene
D. Polynuclear Aromatic Compounds
   2,4-dinitro-1-naphthol-7-sulfonic acid
   2,4-dinitro-1-naphthol
   1-nitronaphthalene
E. Quinone Compounds
   2-nitrophenanthraquinone
   5-nitro-1-anthraquinone sulfonic acid
   Nitroalizarine
F. Nitroso Compounds
   Metanitrosonitrobenzene
G. Benzimidazoles
   6-nitrobenzimidazole
H. Indazoles
   5-nitroindazole
I. Quinolines
   5-nitroisoquinoline
   6-nitroquinoline
   8-nitroquinoline
J. Thiophene Derivatives
   2-nitrothiophene
K. Triazole Derivatives
   5-nitrobenzotriazole
L. Furan Derivatives
   5-nitro-2-furanmethanodioldiacetate
   2-nitrofuran
   2-methyl-5-nitrofuran
   2,5-dinitrofuran
M. Pyridone Derivatives
   3-cyano-5-nitro-2-pyridone
N. Pyridine Derivatives
   Ethyl-2-methyl-5-nitronicotinate
O. Amidines of Carbonic Acid
   Nitroguanidine
P. Cyclic Ureides
   5-nitrobarbituric acid
   5-nitrouracil
Q. Alkane Derivatives
   2,2-chloronitropropane
   2,2-dinitropropane
   Tetranitromethane
   1,1,4,4-tetrabromo-1,4-dinitrobutane
R. Aliphatic Alcohols
   2-nitro-2-ethyl-1,3-propanediol
   2-nitro-1-butanol
S. Aliphatic Acid Derivatives
   4-bromo-4,4-dinitrobutyric acid
T. Aliphatic Ester Derivatives
   Dimethyl-5,5-dinitro-2,8-diaza-1,9-nonanedioate
   Dimethyl-4,4-dinitro-1,7-heptanedioate
   2-nitroisobutylphosphate
   2-nitroisobutylacetate
   2-chloro-2-nitropropyl ester of dicarboxylic acids from carbonic up to sebacic acid
U. Aliphatic Ketone Derivatives
   2-nitro-1,3-indanedione
V. Aliphatic Aldehyde Derivatives
   Sodium nitromalonaldehyde
W. Combinations of Aromatic and Aliphatic Compounds
   2-chloro-2-nitropropyl esters of dicarboxylic acids from carbonic up to sebacic acid Any organic compound having a nitro group is useful in the cathodes of the primary cells of the invention. The primary cells of the invention all utilize the electron change obtained in converting a nitrogen atom with a valence of plus 3 in a nitro group to a nitrogen radical with a valence of minus 3 as in an amine group. This is shown schematically by the following equation:

$$N^{+3} + 6e \rightarrow N^{-3}$$

In addition to a nitro group, the nitro organic compounds may have other groups in their structure, for example, the following groups may be included:
—$CONH_2$, —$SO_3H$, —CHO, —Ar, —CCOAr, —$CO_2H$, —$CO_2R$, —X, —COR, —$COCO_2H$, —CN, —$CX_3$, —$NH^+_3$, —OH, —OR, —$OA_c$, —NO, —$NH_2$, —NHR, —NR$_2$, —NHA$_c$, —N=N—, —CH$_3$, —CH$_2$SO$_3$H, —NAr$_2$, —CH$_2$CO$_2$H, —CH$_2$NH$_2$, —CH$_2$CN,

—CH$_2$CH$_2$CO$_2$H

—CH=CHCO$_2$H, —CH=CHNO$_2$, —C≡CCO$_2$H,

—C$_6$H$_5$

Na, K; where R represents an alkyl radical, Ar represents an aromatic radical and X represents a halogen.

A nitro organic compound may include more than one nitro group in its structure. Although all nitro organic compounds may be used in primary cells of the invention, some of the more complex compounds having more than two nitro groups are unstable and, as a practical matter, would not be employed in their unstable state. In addition, various ones of the foregoing groups may be combined in a nitro organic compound to vary its potential, solubility and capacity. For example, when meta-directing groups, such as —NO$_2$, —SO$_3$H, —COOH, are combined in compounds including a benzene ring, then primary cells employing such compounds as cathode materials have a higher operating voltage. As another example, when a nitro organic acid compound is esterified, its solubility is decreased. The cathodes of the primary cells of the invention may also comprise a mixture of one or more nitro organic compounds, or a mixture with one or more other organic oxidizing compounds, such as nitroso organic compounds, or with inorganic cathode materials such as manganese dioxide or the like.

*Nitroso Compounds*

The nitroso compounds which are insoluble in conventional electrolytes are particularly suitable for use as cathode materials in dry cells. These nitroso compounds are described in detail in a copending application of C. K. Morehouse, Serial No. 591,051, filed June 13, 1956, issued October 7, 1958 as U.S. Patent 2,855,452 and assigned to the instant assignee. Some of these insoluble nitroso organic compounds are immiscible in the electrolyte and can be adsorbed by materials such as acetylene black or graphite. Nitroso compounds soluble in the cell electrolyte may be used in reserve cells.

The following list includes some of the nitroso compounds which are useful in preparing primary cells according to the invention. The members of the list are intended as examples only.

A. Aromatic Benzene C-Nitroso Compounds
  Nitrosobenzene
  p-Nitrosodimethylaniline and salts thereof such as:
    Chlorides,
    Nitrates, and
    Sulfates
  p-Nitrosodiethylaniline and salts thereof such as:
    Chlorides,
    Bromides,
    Nitrates, and
    Sulfates
  4-nitroso-3-methyldimethylaniline
  N, 4-dinitroso-N-ethylaniline
  4-nitroso-3-hydroxyacetanilide
  Isomers of nitrosobenzoic acid and
  Salts and esters thereof
  Isomers of halo-nitrosobenzene such as:
    2 chloronitrosobenzene,
    3 chloronitrosobenzene,
    2 bromonitrosobenzene,
  Alkoxyl isomers such as:
    2 methoxynitrosobenzene, and
    3 ethoxynitrosobenzene
B. Aromatic Benzene C-Nitroso Compounds Containing Another Oxidizable Group on Ring Such as —NO$_2$
  m-Nitronitrosobenzene
  4-nitroso-3-nitrotoluene
C. Aromatic Naphthalene C-Nitroso Compounds
  1-nitroso-2-naphthol
  2-nitroso-1-naphthol
  1-nitroso-2-naphthol-3,6-disulfonic acid disodium salt
D. Aromatic Quinoline C-Nitroso Compound
  5-nitroso-8-hydroxy quinoline
E. Alicyclic C-Nitroso Compounds
  2-chloro-1-methyl-2-nitrosocyclohexane
  2-chloro-2-nitrosopinane
  2-chloro-2-nitrosocarene
F. Aromatic Benzene C-Dinitroso Compounds
  2,4-dinitrosoresorcinol
  p-Dinitrosobenzene
G. Aromatic Naphthalene C-Dinitroso Compounds
  1,4-dinitrosonaphthalene
H. Aliphatic C-Nitroso Compounds
  2-nitro-2-nitrosopropane
  2-nitroso-2-methyl propane
  2-chloro-2-nitrosobutane
  Trichloronitrosomethane Any nitroso organic compound may be used in the cathodes of the primary cells of the invention. The primary cells of the invention all utilize the electron change obtained by converting a nitrogen atom with a valence of +1, as in a nitroso group, to a nitrogen radical with a valence of —3, as in an amine group. This is shown schematically by the following equation:

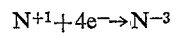
$$N^{+1} + 4e^- \rightarrow N^{-3}$$

In addition, such compounds may have other groups in their structure which alter their physical and chemical properties to affect the stability and solubility in the electrolyte. It is also recognized that, by changing the structure of the nitroso organic compounds, one may alter the theoretical capacity, shelf life and the rate at which electric energy can be withdrawn from the cell can be altered. The selection of the particular compound and its structure will depend on the application for which the particular primary cell is intended. The utility of the nitroso organic compounds may be further enhanced by the presence of oxidizing groups such as nitro, azo, etc. groups which will increase the theoretical capacity.

The cathodes of the primary cells of the invention may also comprise a mixture of one or more nitroso organic compounds, or a mixture with one or more other organic oxidizing compounds, such as nitro organic compounds, or with inorganic cathode materials such as manganese dioxide or the like.

*Aliphatic Azo Compounds*

The aliphatic azo organic compounds which are insoluble in conventional electrolytes are particularly suitable for use as cathode materials in dry cells. These aliphatic azo organic compounds are described in detail in a copending application of C. K. Morehouse and R. Glicksman, Serial No. 591,122, filed June 13, 1956, issued May 27, 1958 as U.S. Patent 2,836,644 and assigned to the instant assignee. Azo organic compounds soluble in the cell electrolyte may be used in reserve cells.

The following list includes some of the azo organic compounds which are useful in preparing primary cells according to the invention. The members of the list are intended as examples only.

A. N,N′ dichloroazodicarbonamidine
B. N,N′ dibromoazodicarbonamidine
C. Azodicarbonamide and acid salts thereof such as:
    Azodicarbonamide nitrate and
    Azodicarbonamide sulfate
D. Azoformic acid and inorganic salts thereof such as:
    Sodium azoformate and
    Potassium azoformate
E. Alkyl and aryl ester of azoformic acid such as:
    Ethylazoformate,
    Methylazoformate,
    Phenylazoformate, and
    Isobutylazoformate F. Nitro alkyl and aryl esters of azoformic acid such as:
2-chloro-2-nitropropyl azoformate,
3,3′-dinitrobutylazoformate, and
2,4-dinitrophenylazoformate Any azo organic compound may be used in the cathodes of the primary cells of the invention. The primary cells of the invention all utilize the electron change obtained by converting a double bonded nitrogen to a single bonded nitrogen. This is shown schematically by the following equation:

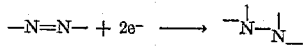

Under more vigorous conditions, it may be possible to obtain further reduction.

In addition, such compounds may have other radicals in their structure which alter their physical and chemical properties to affect the stability and solubility of the electrolyte. It is also recognized that by changing the structure of the azo organic compounds, the theoretical capacity, shelf life and the rate at which electric energy can be withdrawn from the cell can be altered. The selection of the particular compound and its structure will depend on the application for which the particular primary cell is intended. The utility of the azo organic compounds may be further enhanced by the presence of oxidizing radicals such as nitro groups, positive halogen groups, etc. which increase the theoretical capacity.

The cathodes of the primary cells of the invention may also comprise a mixture of one or more azo organic compounds, or a mixture with one or more other organic oxidizing compounds such as a nitro organic compound, or with inorganic cathode materials such as manganese dioxide.

N-Halogen Compounds

The cathode may include an organic oxidizing substance in which the oxidizing properties are due at least in part to positive halogens combined in said substance. The halogens include chlorine, bromine and iodine. These substances are also referred to as positive halogen organic compounds and are disclosed in detail in a copending application of C. K. Morehouse and R. Glicksman, Serial No. 591,195, filed June 13, 1956, issued February 17, 1959, as U.S. Patent 2,874,204 and assigned to the instant assignee. During the electrochemical action, the substance undergoes a reduction as the primary cell furnishes electric current.

An organic oxidizing substance containing positive halogens, when treated with water yields hypohalous acid, a powerful oxidizing agent, of the form HOX, where X designates any one of the following halogen group: chlorine, bromine and iodine. Thus a test for a positive halogen comprises reacting the material in question with an acidified aqueous solution of an iodide compound which is oxidized by the hypohalous acid liberated by the reaction of the substance with water, liberating iodine. For example, the following equations illustrate the release of iodine by a reaction between water, N,N dichloromethylamine, and hydrogen iodide:

$$(CH_3)_2NCl_2 + 2HOH \rightarrow (CH_3)_2NH_2 + 2HOCl$$
$$2HOCl + 4HI \rightarrow 2I_2 + 2HCl + 2HOH$$

Some of the positive halogen organic compounds are relatively insoluble in conventional electrolytes and are particularly suitable as cathode materials in dry cells. Some of the insoluble positive halogen organic compounds are also liquids which are immiscible with the electrolyte and can be adsorbed by a material such as acetylene black or graphite. Some of the positive halogen organic compounds may be soluble in the cell electrolyte. These substances may be used in reserve cells.

The following list includes some of the positive halogen organic compounds which are useful in preparing the primary cell according to the invention. The members of the list are intended as examples only. In the list, X is meant to refer to a halogen atom, such as chlorine, bromine or iodine.

A. Amines of the general formula $RNHX$, $RNX_2$, $R_2NX$ where R is an alkyl radical. A typical example of this class is:
  N,N-dichloromethylamine
B. Amides
  1. Carboxylic acid amides
    (a) Aliphatic monocarboxylic acid amides
      N-chloroacetamide
      N-bromoacetamide
    (b) Aliphatic dicarboxylic acid amides
      N,N′-dibromosuccinamide
      N,N′-dibromooxamide
      N,N′-dibromoadipamide
    (c) Aromatic monocarboxylic acid amides
      N-bromobenzamide
    (d) Aromatic dicarboxylic acid amides
      N,N′-dibromoterephthalamide
  2. Sulfonic acid amides of the formula $RSCONHX$ and $RSOCHX_2$
    Sodium salt of N-chlorobenzenesulfonamide
    Sodium salt of N-chloro-p-toluenesulfonamide
    N,N-dichloro-p-toluenesulfonamide and N,N-dibromo-p-toluenesulfonamide
  3. Derivatives of carbonic acid amides
    N,N′-dichlorobiuret and dibromobiuret
C. Imides Derived from Dibasic Acids
  N-chlorosuccinimide
  N-bromosuccinimide
  N-bromophthalimide
  Ethyl-N-bromophthalimide
D. Quinone Imides
  N,2,6-trichloro-p-quinoneimine
  N-chloro-p-quinoneimine
E. Cyclic Ureides
  N-monochloro and monobromo dimethylhydantoin
  N,N′-dichloro and dibromodimethylhydantoin
  N,N′-dichloro and dibromodiphenylhydantoin
F. Amidines of Carbonic Acid
  Trichloromelamine and tribromomelamine
  Hexachloromelamine
  Penta and tetra chloromelamines—these are mixtures of trichloro and hexachloromelamines
  N,N′-dichloroazodicarbonamidine
  Trichloroisocyanuric acid
  N-chloroacetoguanamine
  N-chloropropoguanamine
  N-chlorodicyandiamide
  Dichloroisocyanuric acid Any positive halogen organic compound may be used as cathodes of the primary cells of the invention. The primary cells of the invention all utilize the electron change obtained in converting a positive halogen ion to a negative halogen ion. This is shown schematically by the following equation where X is a halogen:

$$X^+ + 2e^- \rightarrow X^-$$

In addition, such compounds may have other radicals in their structure which alter their physical and chemical properties to affect the stability and solubility in the electrolyte. It is also recognized that by changing the structure of the positive halogen organic compounds, the theoretical capacity, shelf life and the rate at which electrical energy can be withdrawn from the cell can be altered. The selection of the particular compound and its structure will depend on the application for which the particular primary cell is intended. The utility of the positive halogen organic compound may be further enhanced by the presence of oxidizing radicals such as nitro, azo, etc. groups that will increase the theoretical capacity. The cathodes of the primary cells of the invention may also comprise a mixture of one or more positive halogen organic compounds, or a mixture with one or more other organic oxidizing compounds, such as quinones, or certain organic azo compounds, or with inorganic cathode materials such as manganese dioxide or the like.

The cathodes of the invention may be fabricated by a number of methods and in various shapes. In Examples 1 and 2 the method of preparing a mixture of powdered cathode materials with electrolyte and then pressing a quantity of the mixture to the desired shape and density was described. The cathode mix may also if desired include an inert binder such as polyvinyl alcohol, carboxymethylcellulose, methylcellulose, a vinyl resin, bentonite or silica gel. Such mixtures may be pressed as described above or cast to fabricate the cathode.

In some cases, it is desirable to increase the amount of active surface on the cathode. One method for increasing the active surface is to add a proportion of a soluble material, such as sodium chloride, to the cathode mix before fabrication. Upon fabrication, the soluble material is dissolved out of the cathode, leaving a somewhat porous structure with a greatly increased proportion of active surface.

The presence of atmospheric oxygen enhances the capacity of the cathode of cells of various kinds. For example, capacity increases can be realized in the cells of FIGURE 1 by providing a small vent (e.g., 0.05 inch in diameter) in the wax layer 16. This may be done by preparing a tab (not shown) on the washer 15, which tab extends up through the wax seal 16. The maximum effect of the atmospheric oxygen is ordinarily obtained when the current drain is relatively light.

The following examples may be prepared and cells constructed and arranged according to the techniques and methods set forth in the description of Examples 1 and 2. Many variations in the anode, cathode, and electrolyte materials are possible and these possibilities are demonstrated by the following examples. Unless otherwise indicated all of the cells have magnesium anodes of the AZ10A alloy type as in the cells of Examples 1 and 2. Likewise all cells are dry cells unless otherwise noted.

EXAMPLE 3

A dry cell, constructed substantially the same as the cells of Examples 1 and 2 as shown in FIGURE 1, is made up with a cathode mix as follows:

| | |
|---|---|
| $MnO_2$ (African) _____grams__ | 87 |
| Shawinigan acetylene black _____do____ | 10 |
| Barium chromate _____do____ | 3 |
| Aqueous molar solution of $LiNH_2SO_3$ containing 1 gram of $Li_2CrO_4 \cdot 2H_2O$ per liter of water, saturated with $Mg(OH)_2$ _____ml__ | 44 |

The bobbin weight is 8 grams. The characteristic discharge curve at 150 ohm load for an "AA" size cell made according to this example is shown by curve 71 in FIGURE 7. At this drain the cell provides a voltage which does not decline to the 0.9 voltage cutoff until after 105 hours.

EXAMPLE 4

A dry cell, constructed substantially the same as the cells of Examples 1 and 2 as shown in FIGURE 1, is made up with a cathode mix as follows:

| | |
|---|---|
| $MnO_2$ (African) _____grams__ | 87 |
| Shawinigan acetylene black _____do____ | 10 |
| Barium chromate _____do____ | 3 |
| Aqueous molar solution of sodium sulfamate, saturated with magnesium hydroxide and containing 1 gram of $Li_2CrO_4 \cdot 2H_2O$ per liter_____ml__ | 42 |

The bobbin weight is 8 grams. Referring to FIGURE 7, the characteristic discharge curve at 150 ohm load for an "AA" size cell made according to this example is shown by curve 72. This cell does not reach the 0.9 voltage cutoff until about 100 hours of operation.

EXAMPLE 5

A dry cell, constructed substantially the same as the cells of Examples 1 and 2 as shown in FIGURE 1, is made up with a cathode mix as follows:

| | |
|---|---|
| Copper oxide _____grams__ | 72 |
| Vulcan XC–72 battery black _____do____ | 16 |
| Barium chromate _____do____ | 2.6 |
| Aqueous molar solution of magnesium sulfamate, saturated with magnesium hydroxide _____ml__ | 57 |

The bobbin weight is 8 grams. The characteristic discharge curve at 150 ohm load for an "AA" size cell made according to this example is shown by curve 73 in FIGURE 7. This cell reaches the 0.9 voltage cutoff after about 275 hours of drain.

EXAMPLE 6

A dry cell, constructed substantially the same as the cells of Examples 1 and 2 as shown in FIGURE 1, is made up with a cathode mix as follows:

| | |
|---|---|
| Silver oxide _____grams__ | 70 |
| Vulcan XC–72 battery black _____do____ | 7 |
| Barium chromate _____do____ | 2 |
| Aqueous molar solution of magnesium sulfamate, saturated with magnesium hydroxide _____ml__ | 31 |

The bobbin weight is 8 grams. The performance of this cell under a 150 ohm drain is shown by curve 74 in FIGURE 7. An "AA" size cell according to this example reaches the 0.9 voltage cutoff point after more than 70 hours of continuous operation.

EXAMPLE 7

A dry cell, constructed substantially the same as the cells of Examples 1 and 2 as shown in FIGURE 1, is made up with a cathode mix as follows:

| | |
|---|---|
| Lead dioxide _____grams__ | 140 |
| Vulcan XC–72 battery black _____do____ | 10 |
| Barium chromate _____do____ | 4.5 |
| Aqueous molar solution of ammonium sulfamate, saturated with magnesium hydroxide _____ml__ | 53 |

The bobbin weight in this example was 10 grams. The characteristic discharge curve at 150 ohm load for an "AA" size cell according to this example is shown by curve 75 in FIGURE 7. For comparison, a Leclanche cell of the prior art is shown in FIGURE 7 as curve 76.

EXAMPLE 8

A dry cell, constructed substantially the same as the cells of Examples 1 and 2 as shown in FIGURE 1, is made up with a cathode mix as follows:

| | |
|---|---|
| Bismuth oxide _____grams__ | 96 |
| Shawinigan acetylene black _____do____ | 12 |
| Barium chromate _____do____ | 3.2 |
| Aqueous molar solution of barium sulfamate, saturated with magnesium hydroxide _____ml__ | 43 |

The bobbin weight is 8 grams. The operating voltage of the cell remains between 0.9 and 1.0 volt on loads which varied from 50 to 300 ohms.

EXAMPLE 9

Another dry cell according to the invention may be prepared according to Example 1 with a cathode mix having the following formulation:

| | |
|---|---|
| Meta-dinitrobenzene _____grams__ | 30 |
| Atlas Darco G–60 carbon _____do____ | 60 |
| Barium chromate _____do____ | 5.4 |
| Aqueous molar solution of magnesium sulfamate, saturated with magnesium hydroxide and containing 1 gram of $Li_2CrO_4 \cdot 2H_2O$ per liter_____ml__ | 100 |

The bobbin weight is 4.5 grams.

EXAMPLE 10

Another dry cell according to the invention may be prepared according to Example 1, using the following formulation for the cathode mix:

| | |
|---|---|
| 1-chloro-2,4-dinitrobenzene | grams__ 15 |
| Atlas Darco G-60 carbon | do____ 30 |
| Barium chromate | do____ 2.7 |
| Aqueous molar solution of potassium sulfamate, saturated with magnesium hydroxide and containing 1 gram of $Li_2CrO_4 \cdot 2H_2O$ per liter | ml__ 55 |

The bobbin weight of this cell is 5 grams. Curve 81 in FIGURE 8 is the discharge curve of the Example 9 dry cell when discharged through a 50 ohm load. Curve 82 in the same figure is the discharge curve of a dry cell in accordance with Example 10 when discharged through a 50 ohm load. For comparison, the discharge curve of a conventional Leclanche cell at the same load is shown in this figure as curve 83.

EXAMPLE 11

Another dry cell according to the invention may be prepared according to Example 1, in which the cathode mix has the following formulation:

| | |
|---|---|
| Para-nitrosodimethylaniline | grams__ 30 |
| Cabot experimental battery black | do____ 15 |
| Barium chromate | do____ 2.7 |
| Aqueous molar solution of calcium sulfamate, saturated with magnesium hydroxide and containing 1 gram of $Li_2CrO_4 \cdot 2H_2O$ per liter | ml__ 52 |

The bobbin weight of this size cell is 4.5 grams. The operating voltage of this cell varied from 1.2 volts to 1.1 volts on loads of 50 ohms and 300 ohms respectively.

Reserve cells may be made in accordance with the instant invention as shown in FIGURE 2, in which FIGURE 2a is the magnesium anode made of AZ31 magnesium alloy; FIGURE 2b is the paper separator; 2c is the grid cathode made by pasting the wet cathode material 20 on both sides of the titanium grid 21; and 2d is the completed reserve cell, with terminals attached, which may be copper strips spot welded to the anode and grid.

EXAMPLE 12

A reserve cell according to the invention may be prepared as shown in FIGURE 2, in which the cathode mix has the following formulation:

| | |
|---|---|
| Dichlorodimethylhydantoin | grams__ 20 |
| Shawinigan acetylene black | do____ 10 |

In this example, 14.5 grams of the above cathode mix was pasted on the titanium grid 21. The electrolyte added just before use is:

45 ml. aqueous molar solution of zinc sulfamate, saturated with ZnO

The cell exhibited an operating voltage of 1.7 volts at a current drain of 130 milliamps, and 1.9 volts at a current drain of 84 milliamps.

EXAMPLE 13

Another reserve cell according to the invention may be prepared as shown in FIGURE 2, except that the cathode mix has the following formulation:

| | |
|---|---|
| Azodicarbonamide | grams__ 20 |
| Shawinigan acetylene black | do____ 10 |

In this example, 20 grams of the above cathode mix was pasted on the titanium grid 21. The electrolyte added just before use is:

50 ml. aqueous molar solution of manganese sulfamate, saturated with $Mn(OH)_2$

This cell had an operating voltage of 1.45 volts at 175 milliamps drain, and 1.6 volts at 74 milliamps drain.

There has thus been described an improved electrochemical system which may be employed in battery cells. There have also been described improved primary cells, both dry and reserve, which are inexpensive to manufacture, can utilize strong oxidizing agents as cathode materials, and exhibit a high energy capacity and a high rate of discharge per unit of volume and weight, as well as a relatively flat operating voltage level over a wide range of current drains.

What is claimed is:

1. In a primary cell, a cathode and a magnesium anode in combination with an electrolyte consisting essentially of water as the solvent, and a solute consisting essentially of water-soluble sulfamates, said sulfamates being selected from those of the group consisting of ammonium, the alkali metals, the alkaline earth metals, aluminum, manganese and zinc, said cathode consisting of a material selected from the class of organic oxidizing agents in which the oxidizing properties are due at least in part to a chemically combined group selected from the nitro groups, nitroso groups, N-halogen, and azo groups.

2. In a primary cell, a cathode and a magnesium base alloy anode in combination with an electrolyte consisting essentially of an aqueous solution of water-soluble sulfamates, said sulfamates being selected from the class consisting of the sulfamates of ammonium, the alkali metals, the alkaline earth metals, aluminum manganese and zinc, said cathode consisting of a material selected from the class of organic oxidizing agents in which the oxidizing properties are due at least in part to a chemically combined group selected from the nitro groups, nitroso groups, N-halogen, and azo groups.

3. In a primary cell, a cathode and a magnesium anode in combination with an electrolyte consisting essentially of an aqueous solution of magnesium sulfamate, said cathode consisting of a material selected from the class of organic oxidizing agents in which the oxidizing properties are due at least in part to a chemically combined group selected from the nitro groups, nitroso groups, N-halogen, and azo groups.

4. A primary cell comprising a magnesium anode, an electrolyte, and a cathode including a depolarizer; said electrolyte consisting essentially of an aqueous solution of water-soluble sulfamates, said sulfamates being selected from the class consisting of ammonium, the alkali metals, the alkaline earth metals, aluminum, manganese, and zinc; said cathohde being selected from the class consisting of organic oxidizing agents in which the oxidizing properties are due at least in part to a chemically combined nitro group.

5. A primary cell comprising a magnesium anode, an electrolyte, and a cathode including a depolarizer; said electrolyte consisting essentially of an aqueous solution of water-soluble sulfamates and mixtures of water-soluble sulfamates, said sulfamates being selected from those of ammonium, the aklali metals, the alkaline earth metals, aluminum, manganese and zinc; said cathode being selected from the group of organic oxidizing agents in which the oxidizing properties are due at least in part to a chemically combined nitroso group.

6. A primary cell comprising a magnesium anode, an electrolyte, and a cathode including a depolarizer; said electrolyte consisting essentially of an aqueous solution of water-soluble sulfamates, said sulfamates being selected from those of ammonium, the alkali metals, the alkaline earth metals, aluminum, manganese, and zinc; said cathode being selected from the group of organic oxidizing agents in which the oxidizing properties are due at least in part to a chemically combined N-halogen group.

7. A primary cell comprising a magnesium anode, an electrolyte, and a cathode including a depolarizer; said electrolyte consisting essentially of an aqueous solution of water-soluble sulfamates, said sulfamates being selected from those of ammonium, the alkali metals, the alkaline earth metals, aluminum, manganese and zinc; said cathode being selected from the class consisting of organic oxidizing agents in which the oxidizing properties are due at least in part to a chemically combined azo group.

8. A primary cell comprising a magnesium anode, an electrolyte and a cathode; said electrolyte consisting essentially of an aqueous solution of water-soluble sulfamates, said sulfamates being selected from those of ammonium, the alkali metals, the alkaline earth metals, aluminum, manganese, and zinc; said cathode including manganese dioxide.

9. A primary cell comprising a magnesium anode, an electrolyte, and a cathode including a depolarizer; said electrolyte consisting essentially of an aqueous solution of magnesium sulfamate; said cathode being an organic oxidizing agent in which the oxidizing properties are due at least in part to a chemically combined nitro group.

10. A primary cell comprising a magnesium anode, an electrolyte, and a cathode including a depolarizer; said electrolyte consisting essentially of an aqueous solution of magnesium sulfamate; said cathode being an organic oxidizing agent in which the oxidizing properties are due at least in part to a chemically combined N-halogen group.

11. A primary cell including a magnesium anode, an electrolyte, and a cathode including a depolarizer; said electrolyte consisting essentially of an aqueous solution of magnesium sulfamate containing a chromate inhibitor; said cathode being an organic oxidizing agent in which the oxidizing properties are due at least in part to a chemically combined nitro group.

12. A primary cell including a magnesium anode, an electrolyte, and a cathode including a depolarizer; said electrolyte consisting essentially of an aqueous solution of magnesium sulfamate containing a chromate inhibitor; said cathode being an organic oxidizing agent in which the oxidizing properties are due at least in part to a chemically combined nitroso group.

13. A primary cell including a magnesium anode, an electrolyte, and a cathode including a depolarizer; said electrolyte consisting essentially of an aqueous solution of magnesium sulfamate containing a chromate inhibitor; said cathode being an organic oxidizing agent in which the oxidizing properties are due at least in part to a chemically combined N-halogen group.

14. A primary cell including a magnesium anode, an electrolyte, and a cathode including a depolarizer; said electrolyte consisting essentially of an aqueous solution of magnesium sulfamate containing a chromate inhibitor; said cathode being an organic oxidizing agent in which the oxidizing properties are due at least in part to a chemically combined azo group.

15. A primary cell including a magnesium anode, an electrolyte consisting essentially of an aqueous solution of magnesium sulfamate, and a cathode including metadinitrobenzene.

16. A primary cell including a magnesium anode, an electrolyte consisting essentially of an aqueous solution of magnesium sulfamate, and a cathode including 3,5 dinitrobenzamide.

17. A primary cell including a magnesium anode, an electrolyte consisting essentially of an aqueous solution of magnesium sulfamate, and a cathode including paranitrosodimethylaniline.

18. A reserve cell including a magnesium anode, an electrolyte consisting essentially of an aqueous solution of manganese sulfamate, and a cathode including N,N'-dichlorodimethylhydantoin.

19. A reserve cell including a magnesium anode, an electrolyte consisting essentially of an aqueous solution of aluminum sulfamate, and a cathode including hexachloromelamine.

20. A reserve cell including a magnesium anode, an electrolyte consisting essentially of an aqueous solution of zinc sulfamate, and a cathode including azodicarbonamide.

References Cited in the file of this patent

UNITED STATES PATENTS

| | | |
|---|---|---|
| 1,134,093 | Bauer | Apr. 6, 1915 |
| 2,810,006 | Ruben | Oct. 15, 1957 |
| 2,855,452 | Morehouse | Oct. 7, 1958 |
| 2,874,204 | Morehouse et al. | Feb. 17, 1959 |
| 2,880,122 | Morehouse | Mar. 31, 1959 |
| 2,948,768 | Ruben | Aug. 9, 1960 |
| 2,976,342 | Morehouse | Mar. 21, 1961 |

OTHER REFERENCES

Morehouse, Journal of the Electrochemical Society, vol. 104, No. 8, August 1957, pages 467–473.